United States Patent [19]

Bussjager et al.

[11] Patent Number: 4,519,539

[45] Date of Patent: May 28, 1985

[54] METHOD AND APPARATUS FOR REGULATING AN ECONOMIZER DAMPER USING INDOOR FAN AIR PRESSURE

[75] Inventors: Rudy C. Bussjager, Chittenango; James J. Del Toro, N. Syracuse, both of N.Y.

[73] Assignee: Carrier Corporation, Syracuse, N.Y.

[21] Appl. No.: 613,471

[22] Filed: May 23, 1984

Related U.S. Application Data

[63] Continuation-in-part of Ser. No. 427,405, Sep. 29, 1982, abandoned.

[51] Int. Cl.³ .............................. G05D 23/13
[52] U.S. Cl. .......................... 236/13; 98/41.3; 165/16; 49/38
[58] Field of Search .............. 165/16; 236/49, 13; 98/41 SV; 49/38, 324

[56] References Cited

U.S. PATENT DOCUMENTS

| | | | |
|---|---|---|---|
| 3,645,108 | 2/1972 | Houk | 236/49 X |
| 4,263,931 | 4/1981 | Bramow et al. | 236/49 X |
| 4,331,291 | 5/1982 | Dean | 236/49 |
| 4,389,853 | 6/1983 | Hile | 236/49 X |

Primary Examiner—William E. Tapolcai
Attorney, Agent, or Firm—Robert H. Kelly

[57] ABSTRACT

A method and apparatus for regulating an economizer damper using indoor fan air pressure is disclosed. The economizer control includes dampers powered by a motive source regulated by air pressure. An outdoor ambient thermostat and a mixed air thermostat are utilized to regulate the air pressure supplied to the motive source to effectively regulate the damper position.

11 Claims, 5 Drawing Figures

METHOD AND APPARATUS FOR REGULATING AN ECONOMIZER DAMPER USING INDOOR FAN AIR PRESSURE

BACKGROUND OF THE INVENTION

This application is a continuation-in-part of application Ser. No. 427,405, filed Sept. 29, 1982, now abandoned.

1. Field of the Invention

This invention in general relates to the control of a damper. More particularly, this invention relates to utilizing air pressure created by a fan for air circulation purposes to adjustably regulate air flow through an economizer.

2. Prior Art

A typical rooftop type packaged air conditioning unit includes a refrigeration circuit having a compressor, a condenser, an evaporator and an expansion device. The unit is divided into an indoor section wherein indoor air is circulated from the enclosure to the unit and is circulated by a fan back to the enclosure after being appropriately conditioned. An economizer for allowing outdoor ambient air to enter the indoor section may also be provided. The outdoor section typically includes a compressor and a condenser as well as an outdoor fan for circulating outdoor air in heat exchange relation with the condenser.

To effectively utilize the economizer, outdoor ambient air is circulated to the indoor section of the unit and to the enclosure when the temperature of the ambient air is such that in effect "free cooling" is provided, that is cooling without operation of the refrigeration circuit. Typical control systems for regulating flow of outdoor ambient air into the indoor section of the air conditioning unit include damper arrangements for effecting the volume flow rate through the economizer to the indoor section. These economizer dampers are often controlled by an electric motor and often only have open and closed positions or a small number of selected positions. More sophisticated electric motors are available for regulating dampers into numerous positions, however, such devices are costly and may require sophisticated electrical control circuitry.

The herein disclosed apparatus concerns a pneumatic or air pressure powered device for adjusting dampers such as an inflatable bag. The air pressure for powering this device is the air pressure generated by the indoor fan in circulating conditioned air to the enclosure. This air pressure is conducted via a conduit located downstream of the indoor fan to the air pressure powered means for effectively regulating the damper. Control apparatus for venting the air pressure in the conduit and in the air powered means is utilized to regulate the position of the damper. This control apparatus includes both an outdoor ambient thermostat for allowing outdoor ambient air to enter the indoor section of the unit only when the outdoor ambient temperature is below a threshhold level as well as a mixed air thermostat for controlling the amount of outdoor air entering the unit to maintain a mixed air temperature when the outdoor air temperature is below a selected level. Both thermostats act to vent the pressurized air in the conduit to the ambient level or the negative pressure side of the indoor fan to regulate the air pressure in the air powered means to control the position of the damper.

SUMMARY OF THE INVENTION

It is an object of the present invention to provide a economizer control for regulating outdoor ambient air flow into an air conditioning unit.

It is a further object of the present invention to provide an air conditioning unit including an economizer control powered by air pressure differentials from a fan of the air conditioning unit.

It is another object of the present invention to provide a method of regulating the flow of air through an economizer based on air pressure differentials.

It is another object of the present invention to provide a damper assembly powered by an inflatable air bag.

It is a further object of the present invention to regulate economizer air flow to an enclosure to be conditioned as a function of the outdoor ambient temperature and of the mixed air temperature of the return air from the enclosure and the economizer air being supplied to the unit.

It is a further object of the present invention to provide apparatus and a method for regulating the positioning of the damper and economizer.

It is a yet further object of the present invention to provide apparatus and a method for providing a damper arrangement which may be regulated to any position between fully closed and fully open to effectively control the flow of air therethrough.

It is a further object of the present invention to provide an economizer control for regulating a damper which is powered solely by air pressure differentials created by the indoor fan for circulating air to an enclosure.

It is another object of the present invention to provide a safe, economical and easy to manufacture economizer control.

Other objects will be apparent from the description to follow and the appended claims.

These and other objects are achieved in accordance with a preferred embodiment wherein there is provided an economizer control for regulating outdoor ambient air flow to an indoor section of an air conditioning unit including an indoor fan for circulating air to the enclosure and an indoor section for receiving air from both the enclosure and the economizer. Damper means for controlling air flow through the economizer to the indoor section of the air conditioning unit are disclosed. Air powered means coacting with the damper means for positioning said damper assembly as well as conduit means for supplying pressurized air from the indoor fan to the air pressure powered means are additionally set forth. A bleed means connected to the conduit means is provided to effectively prevent pressurized air from being supplied to the air pressure powered means, said bleed means including at least one vent bleed outlet controlled in response to a sensed temperature to regulate the amount of pressurized air vented and to thereby regulate the pressure within the air pressure powered means to position the damper means.

An air conditioning unit including a refrigeration circuit and an economizer, said unit having an indoor section with an indoor fan for discharging air from the unit to the enclosure to be conditioned, said indoor section receiving air to be conditioned from the enclosure and from the economizer and a damper for regulating the volume of outdoor air flow into the unit through the economizer are additionally disclosed. Conduit means are positioned to receive pressurized air discharged from the indoor fan and to direct said air to the air pressure powered means connected to the conduit means and coacting with the damper for positioning the damper to control the flow of outdoor air into the unit. Control means for regulating the supply of air to the air pressure powered means to thereby regulate the position of the damper are further disclosed.

A method of regulating the flow of outdoor ambient air through an economizer into an air conditioning unit having an indoor fan for supplying air to an enclosure to be conditioned and an indoor section wherein air from the enclosure and air from the economizer are mixed, said economizer including movable dampers for regulating ambient air flow therethrough is further disclosed. The method of regulating includes controlling the position of the dampers in response to the air pressure within the air pressure powered means, supplying pressurized air from the indoor fan to the step of controlling and regulating the supply of pressurized air to the step of controlling to vary the position of the dampers and thereby regulate air flow through the economizer.

DESCRIPTION OF THE PREFERRED EMBODIMENT

The embodiment hereinafter described will refer to an economizer for use with a packaged rooftop type air conditioning unit. It is to be understood that the economizer may be used with various types of air conditioning units and, as used herein, air conditioning refers to any device which heats, cools, humidifies, ventilates, cleans or otherwise conditions air. The economizer and control therefor as indicated are not limited to a packaged type unit or to a unit incorporating specific components of the refrigeration circuit adjacent the location of the economizer or the fan.

It is further to be understood that although the present device discloses an indoor fan from which air at an increased pressure is utilized as part of a packaged unit that other fans may be utilized to achieve the same end result. Many applications include a return air fan for forcing air from the enclosure back to the air conditioning unit or a power exhaust fan for dissipating air from the unit to the ambient. Additionally, where a condenser is located adjacent the outdoor unit a fan is typically provided for circulating air thereover. Although the indoor fan of the air conditioning unit as shown might be a preferred source of air at an increased pressure necessary to operate the economizer, any of these fans could prove equally suitable.

It is also to be understood that although air pressure differentials are utilized herein to drive the damper assembly located in the economizer for regulating the flow of outdoor ambient air into the air conditioning unit, a coacting set of dampers may be utilized to regulate the flow of return air from the enclosure to the unit. Hence, an additional set of dampers may be desirable such that the volume flow rate of air from the enclosure to the unit may be adjusted simultaneously with the adjustment of the air flow rate into the unit from the economizer such that the same volume air flow to the unit is continuously provided. It would be within the spirit and scope of this invention to provide a control for a separate set of dampers utilizing the same power source and the same regulation means. A single inflatable bag could be utilized to control multiple sets of dampers.

As set forth throughout the specification it is indicated that bleed means are utilized to regulate the supply of pressurized air to air pressure powered means to regulate the position thereof. It is to be understood that the bleed means as utilized herein not only effectively dissipate the air pressure being supplied from the indoor fan but effectively dissipate the air pressure accumulated within the inflatable bag acting as a motive means. Although this distinction will not be made throughout it is to be understood that by bleeding or venting that pressure not only in the conduit from the indoor fan but also from the inflatable bag is dissipated.

Figure 1:
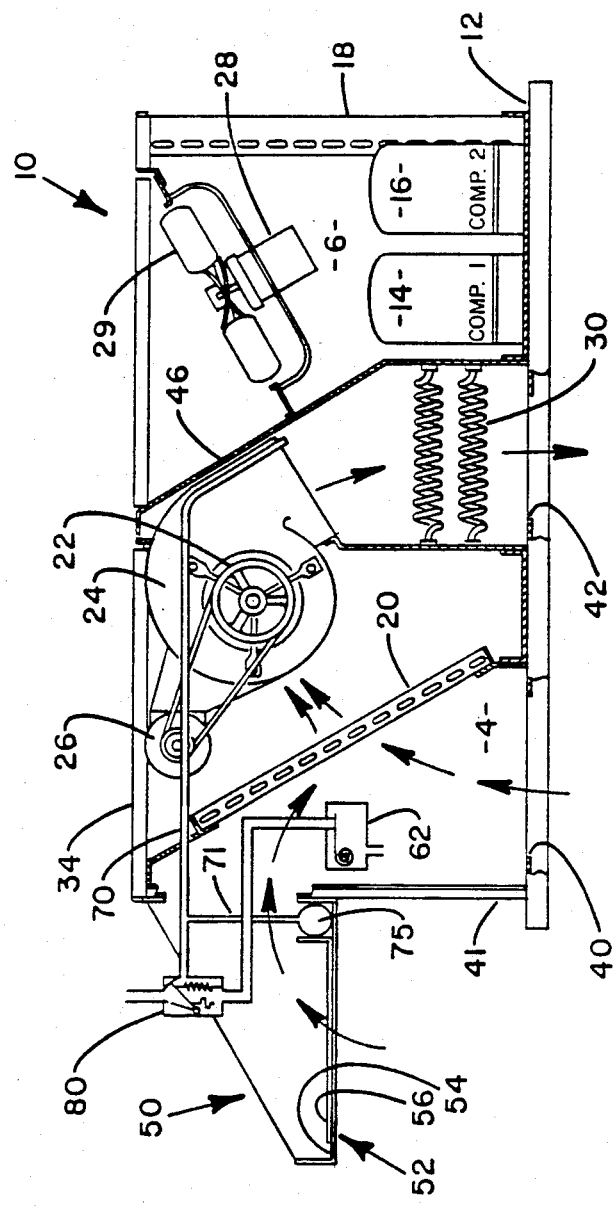
FIG. 1 is a schematic view of an air conditioning unit including an economizer.

Referring now to FIG. 1 there may be seen an air conditioning unit 10 divided into indoor section 4 and outdoor section 6 by partition 46. Within outdoor section 6 are shown compressors referenced 14 and 16, condenser 18 and condenser fan 29 powered by condenser fan motor 28. Ambient air is drawn through the condenser in heat exchange relation with the refrigerant flowing therethrough and is discharged out the top of the unit by the condenser fan.

The indoor section of the unit includes evaporator 20, indoor fan motor 26, fan scroll 24, indoor fan 22, pressurized line or conduit 70, heaters 30, end wall 41, casing 34 and base 12. The indoor section of the unit defines the air flow path for the air to be conditioned and supplied to the enclosure as well as receiving air returning from the enclosure. The arrows in the drawing show the air flow through the unit including air flow upwardly through return air opening 40 at the bottom of the unit and through evaporator 20 into the indoor fan and then downwardly through heaters 30 and through supply air opening 42 back to the enclosure.

Additionally, arrows are shown for indicating air flow from the outdoor ambient through economizer 50 into the unit for mixture with the return air from the enclosure.

Additionally, economizer 50 is shown connected to the air conditioning unit. Economizer 50, as shown, includes damper 52 having bottom plate 54 and top plate 56 located across the bottom thereof to regulate air flow therethrough. Additionally, economizer 50 is shown having an inflatable bag 75 located to displace one plate of the damper relative to the other plate to regulate air flow therethrough. Bag 75 is connected by conduit 71 to conduit 70 such that air pressure from the indoor fan may be directed to the bag. Additionally connected to conduit 70 is outdoor air thermostat valve 80 and mixed air thermostat valve 62.

Figure 2:
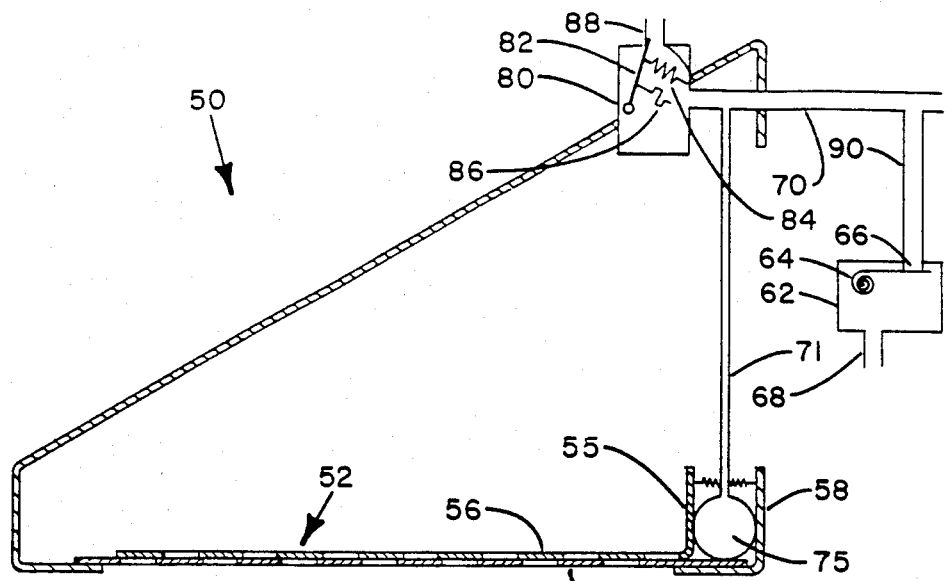
FIG. 2 is an enlarged schematic view of an economizer with the damper in a closed position.

Referring now to FIG. 2, an enlarged view of the economizer section, it can be seen that bag 75 is connected to conduit 71 which is connected to the source of air pressure through conduit 70 such that air pressure may be supplied to bag 75. As bag 75 is inflated it expands between economizer casing 58 and upright portion 55 of top plate 56 to displace the top plate relative to the bottom plate. As will be more particularly described hereinafter, the volume of air flowing through the economizer is regulated by the relative displacement between the top and bottom plates. Conduit 70 is shown additionally connected to outdoor ambient air thermostat valve 80. Outdoor ambient thermostat valve 80 includes an enclosure having a damper 82 (shown in the open position), thermal element 86, spring 84 and vent outlet 88. Damper 82 within the outdoor ambient thermostat 80 is arranged to either prevent or allow pressurized air from conduit 70 to be discharged through vent outlet 88 to the outdoor ambient at the ambient pressure. Spring 84 acts to maintain the damper in the closed position which prevents discharge of pressurized air to the outdoor ambient. Thermal sensing element 86 which is in heat exchange relation with the outdoor ambient air acts to open the damper whenever the outdoor ambient temperature exceeds a threshhold level such as 55° thereby allowing the pressurized air to be vented to the outdoor ambient.

Additionally shown connected to conduit 70 is thermostat conduit 90. Thermostat conduit 90 directs the pressurized air from conduit 70 to mixed air thermostat valve 62. Mixed air thermostat valve 62 includes an enclosure designed for the receipt of pressurized air through conduit 90 and for the discharge of said air through vent bleed discharge 68 if the bimetallic valve element 64 is in the open position. Inlet 66 within mixed air thermostat valve 62 is where thermostat conduit 90 connects to mixed air thermostat valve 62. Element 64, which is shown as a bimetallic, is used for covering said inlet to prevent pressurized air from being discharged through vent bleed discharge 68. If the element 64 is in a position other than in a position as shown then pressurized air is allowed to discharge through vent 68. The mixed air thermostat valve 62 is designed to modulate allowing pressurized air to be vented through vent bleed discharge 68 should the temperature, as sensed by the mixed air thermostat bulb, drop below a threshhold level.

Figure 3:
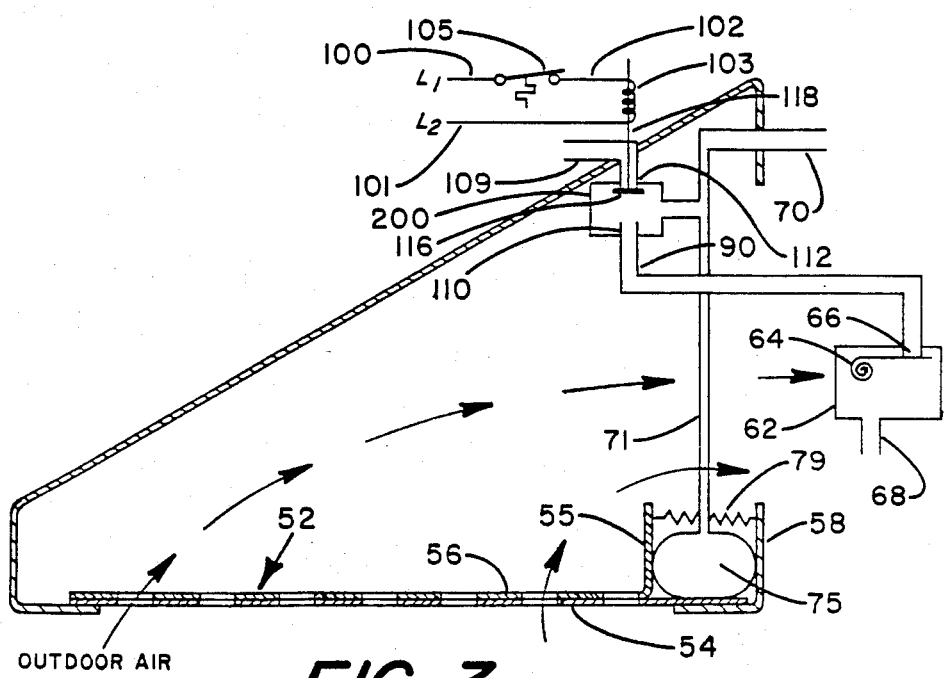
FIG. 3 is an enlarged schematic view of an alternative control embodiment for the economizer with the damper in the open position.

Referring now to FIG. 3 there can be seen an alternative embodiment to that shown in FIG. 2 wherein the outdoor ambient thermostat 80 is replaced with a thermal sensing element controlling an electrically operated damper. Additionally, the economizer damper 56 is shown with the damper in the open position allowing full air flow through the economizer. More specifically, it can be seen that conduit 70 for supplying air under pressure is positioned identically as before. Conduit 70 supplies pressurized air to duct 200. Duct 200 is an enclosure having an inlet 110 to thermostat conduit 90 and an outlet 112 to bleed 109. Valve 116 is positioned to either close the inlet 110 to the thermostat conduit or to close the outlet 112 to bleed 109. Hence, in a first position, the position shown in FIG. 3, air at an increased pressure being supplied through conduit 70 is directed out inlet 110 and is supplied to bag 75. Coil 103 is shown energized as a result of outdoor ambient thermal sensing element 105 closing and power being supplied between lines L-1 and L-2 through wire 100, thermostat 105, wire 102, coil 103 and wire 101 such that the valve is moved upwardly until outlet 112 is blocked by valve 116. In this position air under pressure is supplied through duct 200 to thermostat conduit 90 and from there through inlet 66 to the mixed air thermostat. If valve 116 is in the opposite position blocking inlet 110 the supply of pressurized air is vented through outlet 112 and pressurized air is not supplied to bag 75.

Additionally, in FIG. 3 it can be seen that air under pressure has been supplied through conduit 71 to bag 75 which has expanded displacing top plate 56 to the left relative to bottom plate 54. As the bag expands it acts on economizer casing 58 and upright portion 55 to move one relative to the other. This upright portion 55 is attached to movable top plate 56 and since bottom plate 54 is secured to casing 58 there is relative motion between the top and bottom plates. Spring 79 is shown connected between upright portion 55 and casing 58 to bias the top damper plate toward the closed position. The spring will act to displace the top damper plate to the right should the supply of pressurized air be vented through either vent 109 or vent bleed discharge 68 or should the supply of air under pressure be discontinued by the indoor fan operation being discontinued.

Figure 4:
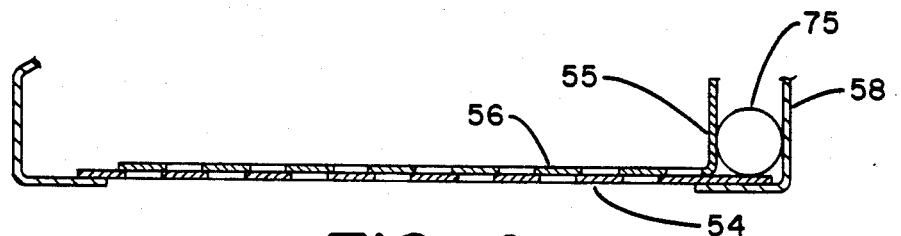
FIG. 4 is an enlarged side view of the damper assembly.
Figure 5:
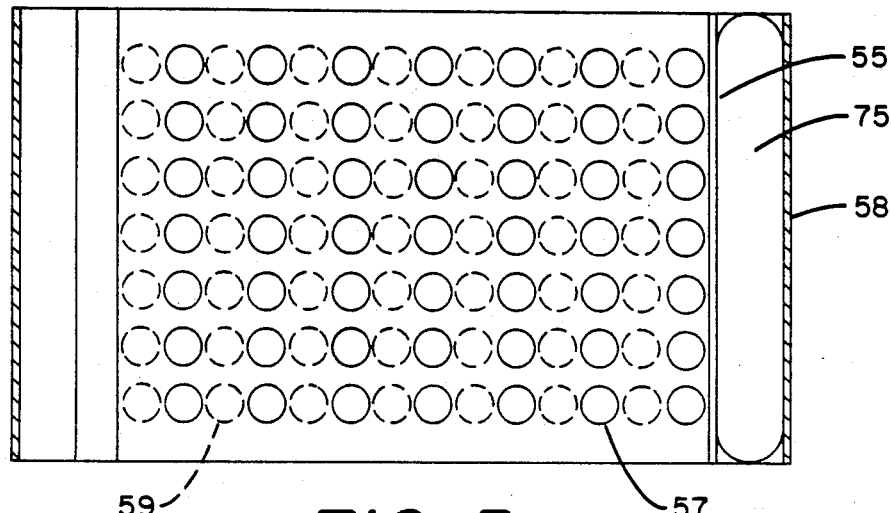
FIG. 5 is an enlarged top view of the damper assembly.

Referring now to FIGS. 4 and 5 specific drawings of the damper assembly may be seen. FIG. 4 is a side view and FIG. 5 is a top view of the damper assembly including a bottom plate 54 and a top plate 56. An upright portion 55 is connected to top plate 56 and is located to define a space between upright portion 55 and casing 58 into which bag 75 is placed. Bottom plate 55 has a plurality of spaced openings 59 shown by dotted lines in FIG. 5. Top plate 56 also has a plurality of spaced openings 57 shown by the circles in FIG. 5. These openings are arranged such that when the dampers are in the closed position, as shown in FIG. 2, the openings in the top and bottom plates are not in registration and there is no air flow through the damper assembly. When the damper is in the open position, as shown in FIG. 3, openings in the top and bottom plates are in registration and air may flow through the damper. Any positioning of the top and bottom plates relative to each other between the positions shown in FIG. 2 and FIG. 3 allows for partial registration and for partial air flow through the damper assembly. Hence, it may be seen that any volume air flow from the economizer that is desired may be accomplished by inflating bag 75 to the degree necessary to allow the appropriate amount of registration between the respective openings in the top and bottom plates.

OPERATION

It is desirable to operate the economizer to allow cool ambient air to enter the air conditioning unit whenever the ambient air temperature is below a threshhold level such as 55° F. It is desired to use the ambient air for cooling because it is more cost effective than operating a refrigeration circuit since the refrigeration circuit requires energy to transfer heat energy from the indoor air to the ambient air. In other words, cool outdoor ambient air is substituted for warmer indoor air rather than the consumption of energy through a refrigeration circuit to transfer heat energy from the indoor air to the outdoor air. Under appropriate conditions, it is desirable to utilize a maximum amount of outdoor air.

Should the outdoor air temperature drop to a point where the entering air from the economizer when mixed with the return air from the enclosure is sufficiently low in temperature that the air being supplied to the enclosure is below comfortable temperature level then additional outdoor air should not be drawn into the unit. The mixed air thermostat is utilized to regulate this potential overcooling of the air being returned to the enclosure.

To effect control of the economizer dampers, air at an increased pressure from the indoor fan is utilized. Typically, the indoor fan of the unit is only operated when an enclosure thermostat is sensing a cooling, heating or other need. Under these conditions the indoor fan is operated and when the indoor fan is operated air under pressure is supplied to pressurized line or conduit 70 and then through conduit 71 to bag 75 to appropriately displace the dampers. To regulate the displacement of the dampers, an outdoor ambient thermostat 80 and the mixed air thermostat 62 are utilized. The outdoor ambient air thermostat 80 is arranged in either the embodiments in FIG. 2 or FIG. 3 such that the outdoor ambient temperature is sensed. When the outdoor ambient temperature is below a threshhold level then the outdoor ambient thermostat acts to prevent the pressurized air in line 70 from being dissipated. If the temperature is above that level then the damper 82, as shown in FIG. 2, is opened allowing the pressurized air to be dissipated which acts to close the damper or to prevent the economizer damper from being opened. Once the outdoor ambient temperature drops damper 82 closes thereby preventing the discharge of pressurized air through vent outlet 88 allowing air under pressure to inflate bag 75 to open the economizer damper.

This economizer operation may continue until the mixed air thermostat valve senses that the temperature of the combined mixed air from the return air from the enclosure and the air flowing through the economizer drops to a point where it is too cold to be circulated to the enclosure. Under these conditions, the mixed air thermostat valve opens allowing the air flowing therethrough to be vented through vent bleed discharge 68. Again, by venting the air under pressure the damper is either brought to a more closed position as a result of the bias applied by spring 79 or air under pressure is not supplied to the damper to open the damper initially.

Hence, it can be seen that the damper assembly may only be positioned in an open position when the indoor fan is energized to supply air under pressure, when the outdoor ambient air thermostat detects an outdoor ambient temperature below a threshhold level and when the mixed air temperature thermostat valve detects a temperature level of the air within the indoor section above a certain level. By appropriate modulation of the mixed air thermostat valve the effective position of the dampers relative to one another may be controlled such that the volume of ambient air entering the unit is effectively regulated.

The herein invention has been described with reference to a particular embodiment. It is to be understood by those skilled in the art that various changes and modifications may be made and equivalents substituted for the elements thereof without departing from the spirit and scope of the invention.

What is claimed is:

1. An economizer control for regulating outdoor ambient air flow to an indoor section of an air conditioning unit including an indoor fan for circulating air to the enclosure and an indoor section for receiving air from both the enclosure and the economizer which comprises:

damper means for controlling air flow through the economizer to the indoor section of the air conditioning unit, said damper means comprising a bottom plate defining spaced openings and having a support surface attached to said bottom plate, and a top plate movable relative to the bottom plate also defining spaced openings and having an upright portion attached thereto such that a space is defined between said support surfaces and said upright portion;

air pressure powered means coacting with the damper means for positioning said damper means;

conduit means for supplying pressurized air from the indoor fan to the air pressure powered means, said air pressure powered means comprising an inflatable bag located in said space and connected to said conduit means for inflating said inflatable bag to displace said top and bottom plates relative to each other whereby when any portion of the openings in the bottom plate are in registration with any portion of the openings in the top plate outdoor ambient air will flow through the economizer; and bleed means connected to the conduit means to effectively prevent pressurized air from being supplied to the air pressure powered means, said bleed means including at least one vent bleed outlet controlled in response to a sensed temperature to regulate the amount of pressurized air vented and to thereby regulate the supply of pressurized air to the air pressure powered means to position the damper means.

2. The apparatus as set forth in claim 1 wherein the bleed means further comprises a vent bleed outlet connected to the conduit through an outdoor ambient thermostat including a damper for controlling the flow of pressurized air through the vent bleed from the conduit and a thermal sensing element for positioning the damper in response to the outdoor ambient temperature.

3. The apparatus as set forth in claim 2 wherein the bleed means further comprises a vent bleed discharge connected to the outdoor ambient thermostat through a mixed air thermostat such that pressurized air if not vented in the outdoor ambient thermostat is supplied to the mixed air thermostat, said mixed air thermostat including a damper for regulating the flow of pressurized air through the vent bleed discharge and a thermal positioning element responsive to the air temperature of the mixed air to position said element for regulating the amount of pressurized air flow through the vent bleed discharge.

4. An air conditioning unit including a refrigeration circuit and an economizer, said unit having an indoor section with an indoor fan for discharging air from the unit to the enclosure to be conditioned, said indoor section receiving air to be conditioned from the enclosure and from the economizer and a damper for regulating the volume of outdoor air flow into the unit through the economizer which comprises:

conduit means positioned to receive pressurized air being discharged from the indoor fan;

the damper including a bottom plate defining spaced openings and a top plate also defining spaced openings said bottom and top plates slidable relative to each other whereby when any portion of the openings in the bottom plate are in registration with any portion of the openings in the top plate outdoor ambient air will flow through the economizer, said top plate having a surface portion attached thereto and said bottom plate having a fixed surface portion attached thereto such that a space is defined between said surface portion and said fixed surface portion;